United States Patent
Turner et al.

(10) Patent No.: US 7,281,069 B2
(45) Date of Patent: Oct. 9, 2007

(54) METHOD AND SYSTEM FOR EXTENDING THE FUNCTIONALITY OF AN EMBEDDED USB TRANSCEIVER INTERFACE TO HANDLE THRESHOLD SHIFT OF A USB 2.0 BUS DURING HIGH-SPEED CHIRP

(75) Inventors: Tony Turner, Foothill Ranch, CA (US); John Lupienski, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 203 days.

(21) Appl. No.: 10/929,779

(22) Filed: Aug. 31, 2004

(65) Prior Publication Data

US 2006/0047881 A1    Mar. 2, 2006

(51) Int. Cl.
*G06F 13/42*    (2006.01)
*G06F 3/00*    (2006.01)

(52) U.S. Cl. .................... 710/105; 710/110
(58) Field of Classification Search ............ 710/105, 710/106, 107, 110
See application file for complete search history.

(56) References Cited

U.S. PATENT DOCUMENTS

| | | | | |
|---|---|---|---|---|
| 6,131,134 | A * | 10/2000 | Huang et al. ............. | 710/302 |
| 6,141,719 | A * | 10/2000 | Rafferty et al. ........... | 710/316 |
| 6,611,552 | B2 * | 8/2003 | Beck ....................... | 375/219 |
| 6,625,790 | B1 * | 9/2003 | Casebolt et al. .......... | 716/8 |
| 6,791,950 | B2 * | 9/2004 | Wu .......................... | 370/257 |
| 6,862,258 | B2 * | 3/2005 | Kitagawa ................. | 369/53.3 |
| 7,173,964 | B2 * | 2/2007 | Hsu ......................... | 375/225 |
| 2002/0129180 | A1 * | 9/2002 | Kitagawa ................. | 710/105 |
| 2003/0206547 | A1 * | 11/2003 | Cho ......................... | 370/364 |

FOREIGN PATENT DOCUMENTS

WO    WO 2004061636    *    7/2004

OTHER PUBLICATIONS

McGowan, Steve, *USB 2.0 Transceiver Macrocell Interface (UTMI) Specfication, Version 1.05*, Intel Corporation, Mar. 29, 2001, 66 pages, printed from http://www.intel.com/technology/usb/spec.htm#usb4.

Talarek, Wes, *USB 2.0 Transceiver Macrocell Tester (T&MT) Interface Specification, Version, 1.2*, Intel Corporation, Apr. 4, 2001, 16 pages, printed from http://www.intel.com/technology/usb/spec.htm#usb4.

Tengstrand, Peter, "Succeeding with UTMI," ARC International, Jun. 12, 2002, 30 pages, printed from http://www.usb.corg/developers/presentations/pres9602/peter_tengstrand.pdf.

*Universal Serial Bus Specification, Revision 2.0*, USB Implementers Forum, Inc., Apr. 27, 2000, entire document submitted, printed from http://www.usb.org/developers/docs/.

Vertenten, Bart, et al., *UTMI+ Specification, Revision 0.9*, USB Implementers Forum, Inc., Feb. 21, 2003, 25 pages.

* cited by examiner

*Primary Examiner*—Glenn A. Auve
*Assistant Examiner*—Trisha Vu
(74) *Attorney, Agent, or Firm*—Sterne, Kessler, Goldstein & Fox PLLC (57) ABSTRACT

Methods and systems for extending the functionality of an embedded Universal Serial Bus (USB) transceiver interface to handle threshold shift of a USB 2.0 bus during high-speed chirp are presented. A method for a transceiver of a host coupled by a USB 2.0 bus to a device includes receiving a control signal, and selecting one of a first and second zero level voltage threshold according to the control signal. The first threshold is higher than the second to compensate for a shift in a zero level of the bus during high-speed chirp. In one example, the transceiver selects the first threshold when driving a reset signal, and selects the second threshold after detecting a device high-speed chirp signal. In another example, the transceiver selects the second threshold after driving a high-speed chirp sequence. In one example, the control signal includes a signal of a host controller embedded USB transceiver interface.

23 Claims, 7 Drawing Sheets

METHOD AND SYSTEM FOR EXTENDING THE FUNCTIONALITY OF AN EMBEDDED USB TRANSCEIVER INTERFACE TO HANDLE THRESHOLD SHIFT OF A USB 2.0 BUS DURING HIGH-SPEED CHIRP

BACKGROUND OF THE INVENTION

The invention relates generally to communications over a Universal Serial Bus (USB), and more particularly to USB 2.0 high-speed communications. More specifically, the present invention is directed to methods and systems for extending the functionality of an embedded USB transceiver interface to handle threshold shift of a USB 2.0 bus during high-speed chirp.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention. The drawing in which an element first appears is typically indicated by the leftmost digit(s) in the corresponding reference number.

DETAILED DESCRIPTION OF THE INVENTION

Overview

Figure 1:
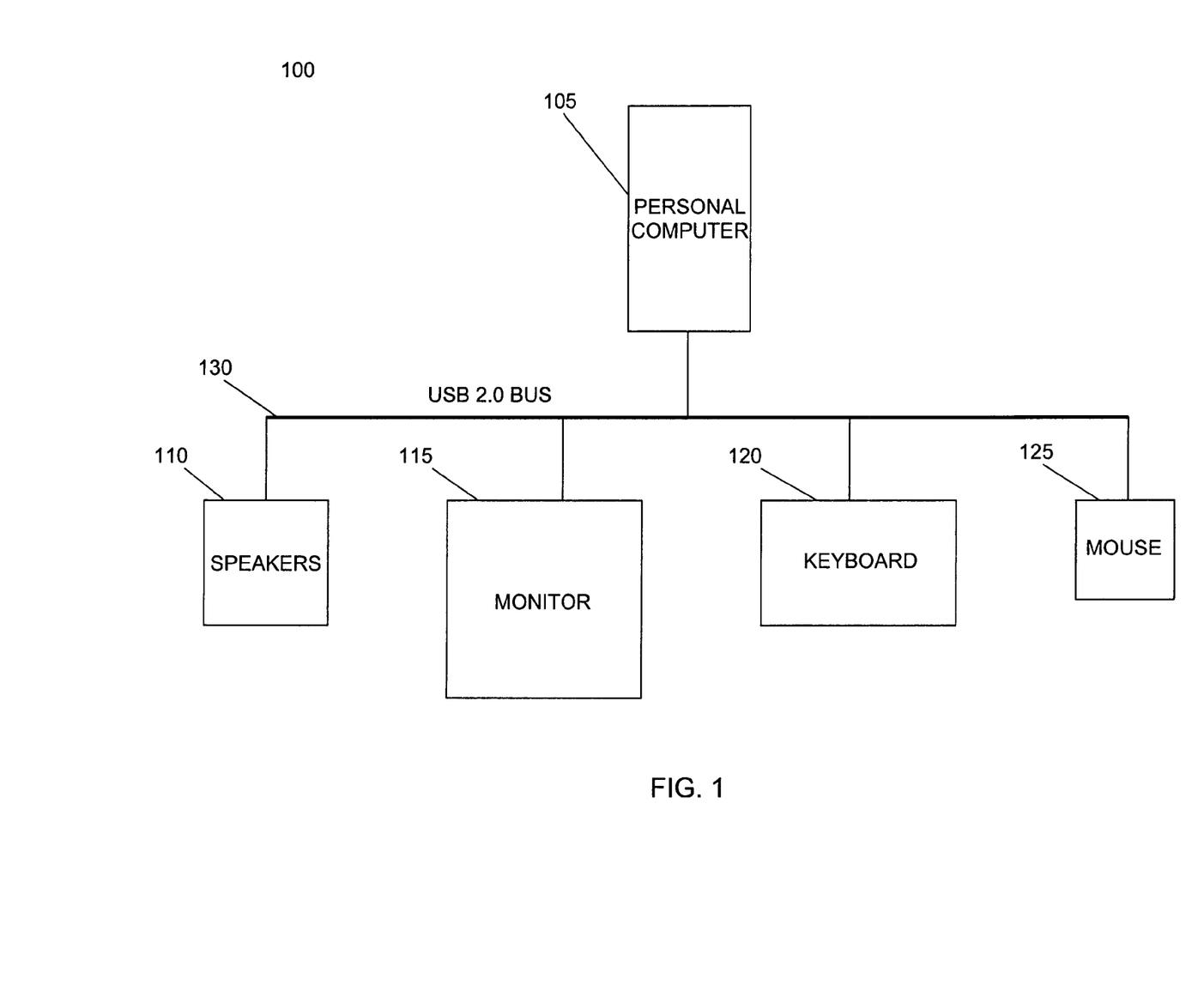
FIG. 1 illustrates a simplified block diagram of an example USB 2.0 environment.
Figure 2:
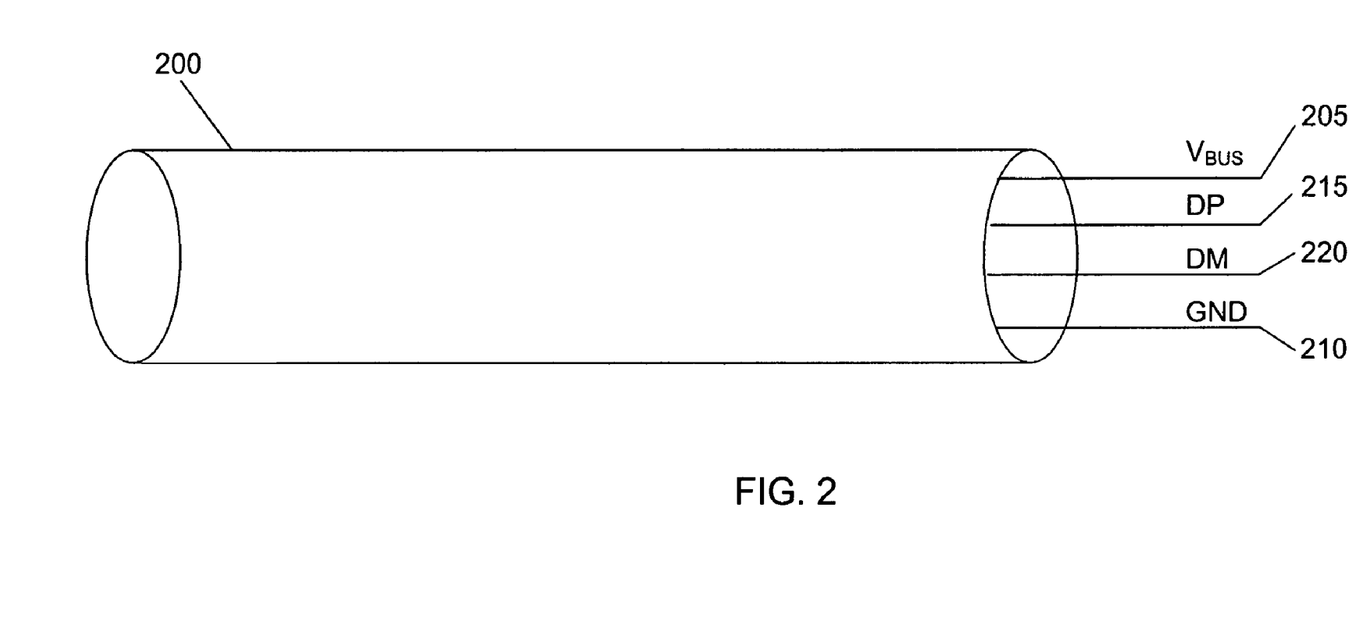
FIG. 2 is a simplified diagram of the electrical configuration of an example USB 2.0 cable.

A USB cable is a cable that attaches one or more USB devices to a USB host computer system. Example USB devices include peripheral devices such as a mouse, keyboard, monitor, microphone, speaker, scanner, etc. The host computer system can be a personal computer. FIG. 1 shows an example USB environment 100. USB cable 130 attaches several USB peripheral devices (i.e., speakers 110, a monitor 115, a keyboard 120, and a mouse 125) to personal computer 105, which is a USB host computer system. FIG. 2 is a simplified diagram of the electrical configuration of an example USB 2.0 cable 200. USB 2.0 cable 200 includes four lines: a voltage line ($V_{BUS}$) 205, a ground line (GND) 210, a data plus (DP) signaling line 215, and a data minus (DM) signaling line 220.

The USB 2.0 protocol added a high-speed signaling bit rate of 480 Mb/s to the low-speed and full-speed signaling bit rates of 1.5 Mb/s and 12 Mb/s, respectively. The *Universal Serial Bus Specification Revision* 2.0, Apr. 27, 2000, which describes the USB 2.0 protocol in detail, is available on-line at http://www.usb.org/developers/docs and is incorporated herein by reference in its entirety.

The USB 2.0 Transceiver Macrocell Interface (UTMI) bus defines a signal set to which USB device developers can design compatible transceivers. The *USB 2.0 Transceiver Macrocell Interface (UTMI) Specification*, Version 1.05, Steve McGowan, Mar. 29, 2001, which describes the UTMI bus in detail, is available on-line at http://www.intel.com/technology/usb/spec.htm and is incorporated herein by reference in its entirety. The *UTMI+ Specification*, Revision 0.9, Bart Vertenten et al., Feb. 21, 2003, is an extension of the UTMI Specification and is also incorporated herein by reference in its entirety.

The present invention is directed to methods and systems for extending the functionality of an embedded USB transceiver interface to handle threshold shift of a USB 2.0 bus during high-speed chirp.

In order to communicate at the 480 Mb/s high-speed signaling bit rate, a USB host computer system and a USB high-speed device engage in high-speed chirp over a USB 2.0 bus. High-speed chirp is a signaling handshake between the host and the device. During high-speed chirp, the host and device transmit a predetermined sequence of chirp signals to indicate that each wants to communicate at the high-speed signaling bit rate (i.e., 480 Mb/s). The USB 2.0 Specification defines two types of chirp signals, chirp K and chirp J. To transmit a chirp J signal, the host or device will drive current into the DP line of the USB 2.0 cable (e.g., DP line 215 shown in FIG. 2). To transmit a chirp K signal, the host or device will drive current into the DM line of the USB 2.0 cable (e.g., DM line 220 shown in FIG. 2).

During high-speed chirp, the zero level of the USB 2.0 bus increases (i.e., the voltage level for a "0" signal increases) because the device has a pull-up resistor connected to the DP line. The pull-up resistor indicates to the host the signaling speed capability of the device. The pull-up resistor is connected to the DP line when the device is operating in the full-speed (i.e., 12 Mb/s) mode, and is disconnected when the device is operating in the high-speed (i.e., 480 Mb/s) mode. According to the USB 2.0 Specification, the device must first attach to the USB 2.0 bus in the full-speed mode before it can operate in the high-speed mode. Therefore, the device attaches to the USB 2.0 bus with the pull-up resistor connected to the DP line.

The shift in the USB 2.0 bus zero level can cause an envelope detector of the host transceiver to falsely detect a "1" signal. For example, the host envelope detector compares the voltage of a received signal to a voltage threshold. According to the USB 2.0 Specification, the zero level voltage threshold is approximately 100 mV. Thus, the host envelope detector will detect a "1" signal when the voltage of a signal on the USB 2.0 bus exceeds 100 mV, and a "0" signal when the voltage of the signal on the USB 2.0 bus is less than 100 mV. Due to the shift in USB 2.0 bus zero level during high-speed chirp, however, the voltage of a "0" signal can exceed 100 mV. Thus, based on the zero level voltage threshold of 100 mV, the host envelope detector will falsely detect a "1" signal when the voltage of a "0" signal exceeds 100 mV.

Accordingly, what is needed is a higher zero level voltage threshold to handle the shift in the zero level of the USB 2.0 bus during high-speed chirp. In the next sections, example embodiments of the present invention for extending the functionality of an embedded USB transceiver interface to handle the threshold shift during high-speed chirp are described. These embodiments are provided for illustrative purposes, but the present invention is not limited to these examples.

In one example embodiment, a method and system for a transceiver of a host coupled by a USB 2.0 bus to a device to handle a threshold shift of the bus during high-speed chirp include receiving a control signal, and selecting one of a first and a second zero level voltage threshold according to the control signal. The first zero level voltage threshold is higher than the second zero level voltage threshold to compensate for a shift in a zero level of the bus during high-speed chirp.

In one embodiment, the method and system include selecting the first zero level voltage threshold when the host drives a reset signal on the bus, and selecting the second zero level voltage threshold when the host detects a device high-speed chirp signal on the bus. In an alternate embodiment, the method and system include selecting the first zero level voltage threshold when the host drives a reset signal on the bus, and selecting the second zero level voltage threshold after the host drives a sequence of high-speed chirp signals on the bus.

In another example embodiment, a method for a host coupled by a USB 2.0 bus to a device to handle a threshold shift of the bus during high-speed chirp includes coupling a signal of a host controller embedded USB transceiver interface to a host receiver, and triggering the host receiver with the embedded USB transceiver interface signal to select one of the first and second zero level voltage thresholds. The method includes coupling a reset signal of the host controller embedded USB transceiver interface to the host receiver.

System for Handling USB 2.0 Bus Threshold Shift During High-Speed Chirp

Figure 3A:
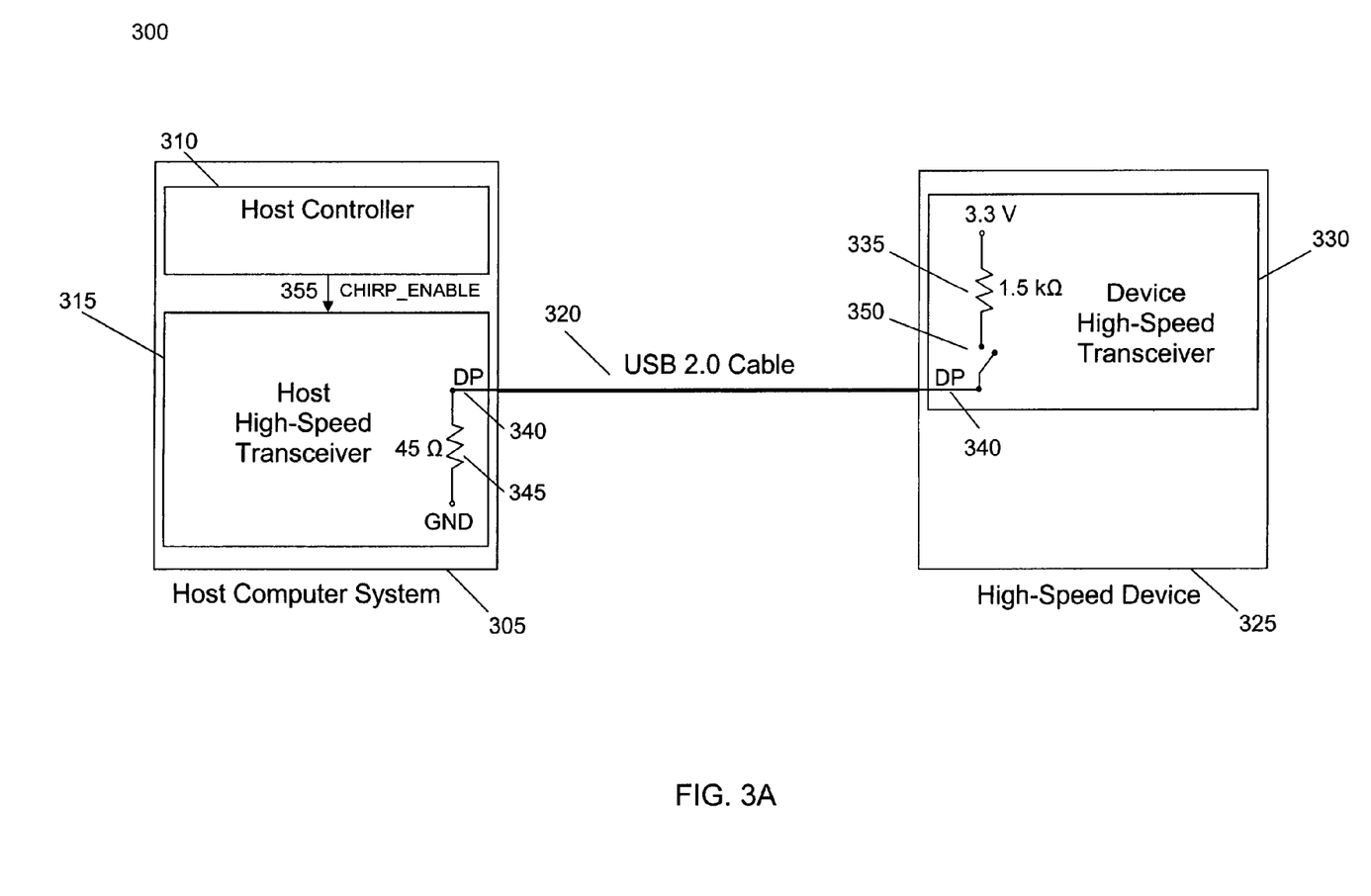
FIG. 3A illustrates a simplified block diagram of a USB 2.0 high-speed system for handling threshold shift of a USB 2.0 bus during high-speed chirp, in accordance with an example embodiment of the present invention.

FIG. 3A illustrates a simplified block diagram of an example USB 2.0 high-speed system 300 having a host computer system 305, a USB 2.0 cable 320, and a high-speed device 325. While system 300 is shown with one high-speed device 325, host computer system 305 can be attached to more than one high-speed device 325, as illustrated in example environment 100 of FIG. 1.

As shown in FIG. 3A, USB 2.0 cable 320 attaches host computer system 305 to high-speed device 325, and includes a DP signaling line 340. Host computer system 305 includes a host controller 310 and a high-speed transceiver 315. Host controller 310 schedules data transfers with high-speed device 325 according to a token-based protocol, and includes an embedded USB transceiver interface (e.g., a UTMI compliant or UTMI+ compliant interface). Host high-speed transceiver 315 includes a pull-down resistor 345 coupled between DP line 340 and ground. An example value of pull-down resistor 345 is 45 Ω(+/−10%).

High-speed device 325 includes a high-speed transceiver 330. Device high-speed transceiver 330 includes a pull-up resistor 335 and a switch 350. Pull-up resistor 335 is coupled between a 3.3 V voltage supply and DP line 340 through switch 350. An example value of pull-up resistor 335 is 1.5 kΩ (+/−10%).

High-speed device 325 is capable of both full-speed (i.e., 12 Mb/s) and high-speed (i.e., 480 Mb/s) communications with host computer system 305. As described above, high-speed device 325 initially attaches to USB 2.0 cable 320 in the full-speed mode, and communicates in the high-speed mode after engaging in high-speed chirp with host computer system 305. In the full-speed mode, switch 350 is closed so that pull-up resistor 335 is coupled between the 3.3 V voltage supply and DP line 340.

The series combination of pull-up resistor 335 and pull-down resistor 345 results in a voltage of up to approximately 130 mV on DP line 340. Thus, during high-speed chirp with host computer system 305, the zero level of the USB 2.0 bus can exceed 100 mV. Therefore, based on a zero level voltage threshold of 100 mV, an envelope detector of host high-speed transceiver 315 will falsely detect a "1" signal when the voltage on DP line 340 is approximately 100 mV to 130 mV.

Upon completion of high-speed chirp with host computer system 305, high-speed device 325 communicates in the high-speed mode. In the high-speed mode, switch 350 is opened so that pull-up resistor 335 is disconnected from DP line 340. After pull-up resistor 335 is disconnected from DP line 340, the zero level of the USB 2.0 bus decreases to below 100 mV. Therefore, based on a zero level voltage threshold of 100 mV, the envelope detector of host high-speed transceiver 315 will accurately detect a "1" signal when the voltage on DP line 340 exceeds 100 mV.

According to an example embodiment of the present invention, a signal of the embedded USB transceiver interface of host controller 310 controls the zero level voltage threshold to handle the shift in the USB 2.0 bus during high-speed chirp. As shown in FIG. 3A, a CHIRP_ENABLE signal 355 is coupled from host controller 310 to host high-speed transceiver 315. CHIRP_ENABLE signal 355 triggers the host envelope detector to select a higher zero level voltage threshold during high-speed chirp, such as approximately 200 mV, and a default zero level voltage threshold after high-speed chirp, such as approximately 100 mV.

Figure 3B:
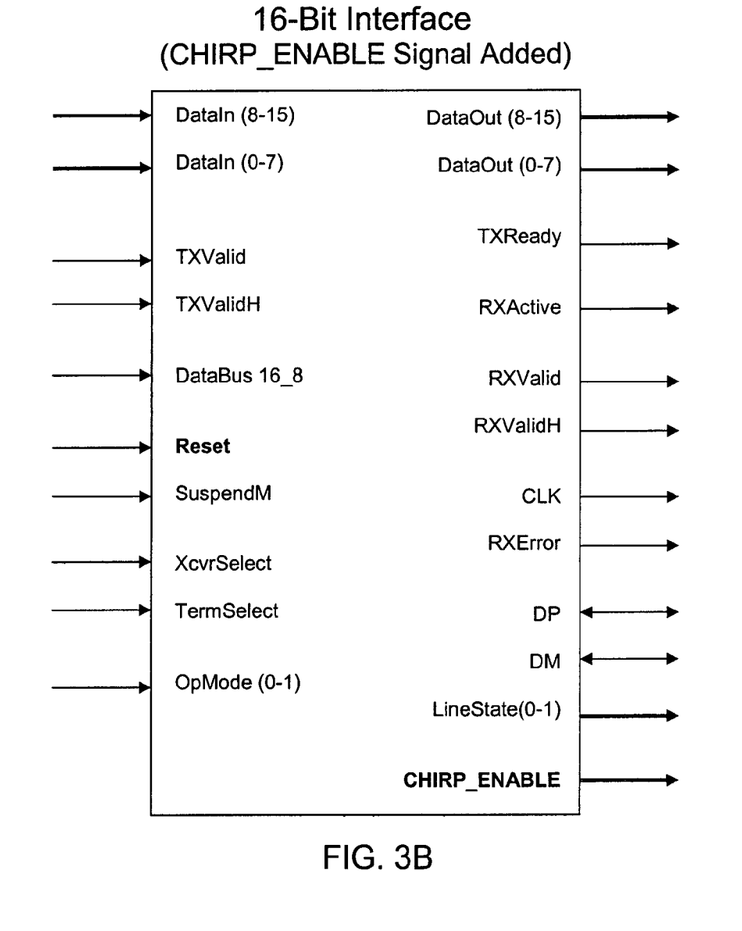
FIG. 3B illustrates a diagram of a UTMI or UTMI+ (level 0) 16-bit interface with an additional CHIRP_ENABLE signal, according to an example embodiment of the present invention.

FIG. 3B illustrates a diagram of a UTMI or UTMI+ (level 0) 16-bit interface with an additional CHIRP_ENABLE signal, according to an example embodiment of the present invention. The UTMI Specification and UTMI+ Specification (for the level 0 transceiver) both define a 16-bit interface for designing compatible device transceivers. CHIRP_ENABLE signal 355 of system 300 can be defined as an additional signal in the UTMI or UTMI+ signal set. In another embodiment, CHIRP_ENABLE signal 355 of system 300 can be a UTMI or UTMI+ specified signal, such as the RESET signal, also shown in FIG. 3B.

By using a control signal to trigger the host transceiver to adjust the zero level voltage threshold to a higher level during high-speed chirp, high-speed system 300 provides more robust signaling, particularly for long USB 2.0 cables and maximum tolerance high-speed devices.

Methods for Handling USB 2.0 Bus Threshold Shift During High-Speed Chirp

Figure 4:
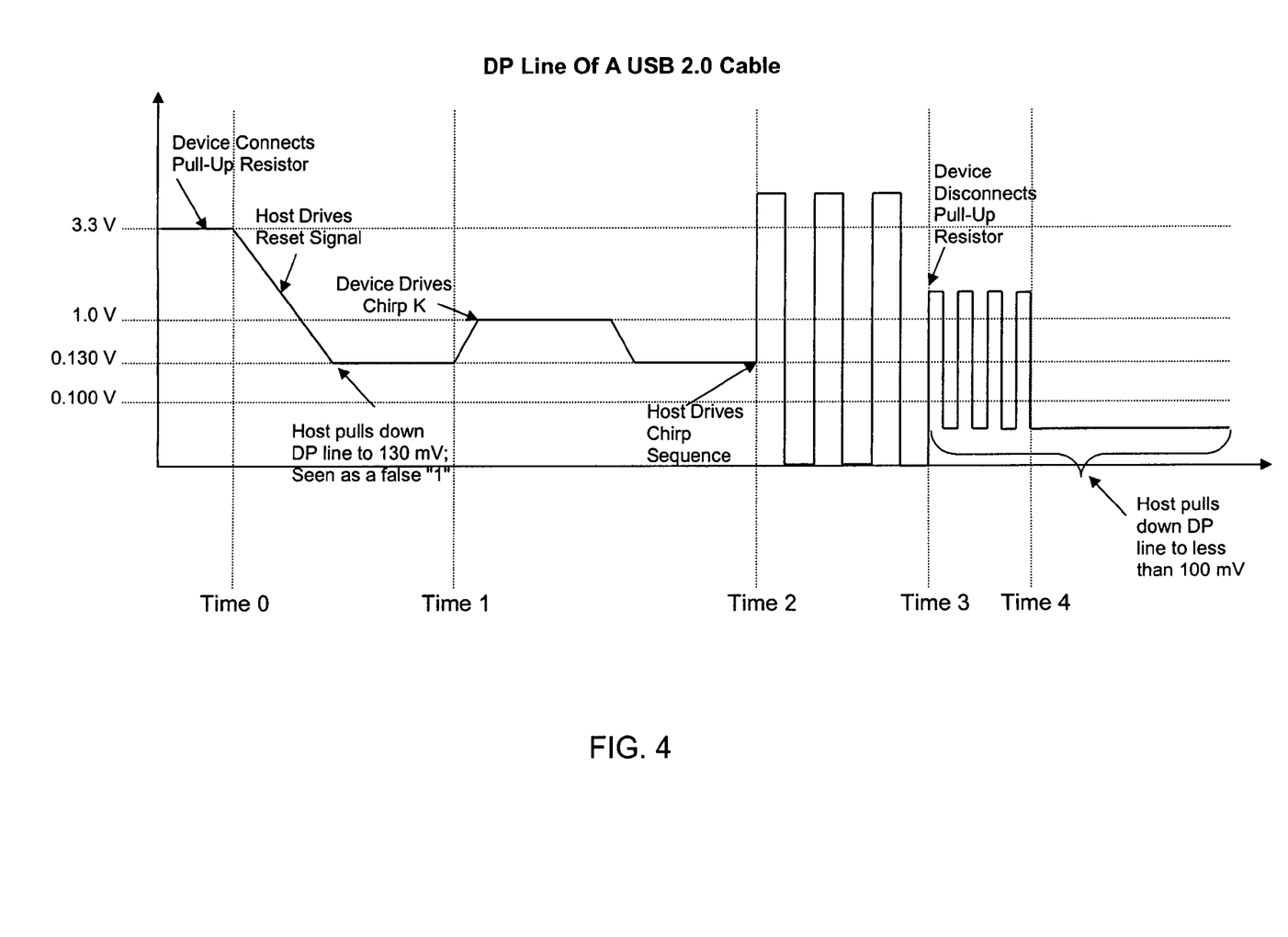
FIG. 4 is a diagram showing the timing of signals on the data plus (DP) line of a USB 2.0 cable during high-speed chirp.

FIG. 4 is diagram showing the timing of signals on the DP line of a USB 2.0 cable during high-speed chirp between a host computer system and a high-speed device. FIG. 4 shows the relative amplitude in Volts of the signals on the DP line versus time. Before Time 0, the device attaches to the USB 2.0 cable in the full-speed mode (i.e., 12 Mb/s) before it can communicate in the high-speed mode (i.e., 480 Mb/s). Thus, the device has a pull-up resistor coupled between a 3.3 V supply and the DP line, as described above with respect to FIG. 3A. As shown in the example of FIG. 4, the amplitude of the signal on the DP line before Time 0 is approximately 3.3 V.

At Time 0, the host drives a reset signal on the USB 2.0 bus and pulls down the DP line. Ideally, the host would pull down the DP line from 3.3 V to 0 V, but because the device pull-up resistor and the host pull-down resistor are coupled to the DP line, the lowest level to which the host can pull down the DP line is approximately 130 mV. Accordingly, based on a zero level voltage threshold of 100 mV, the host will falsely detect a "1" signal after Time 0 because the amplitude of the signal on the DP line exceeds 100 mV (e.g., approximately 130 mV), as shown in the example of FIG. 4.

At Time 1, when the device detects the valid reset signal from the host, the device drives a chirp K signal on the USB 2.0 bus to indicate that it wants to communicate at the high-speed signaling bit rate (i.e., 480 Mb/s) with the host. The amplitude of the device chirp K signal on the DP line is approximately 1.0 V, as shown in the example of FIG. 4.

At Time 2, when the host detects the valid chirp K signal from the device, the host drives a sequence of alternating chirp J and chirp K pulses on the USB 2.0 bus (e.g., J-K-J-K-J-K) until Time 4, as defined by the USB 2.0 Specification. After Time 2 and before Time 3, the amplitude of the chirp pulses is greater than approximately 3.3 V, as shown in the example of FIG. 4.

At Time 3, when the device detects the valid sequence of chirp pulses from the host, the device disconnects the pull-up resistor from the DP line. Thus, after Time 3, the host pulls down the DP line to below 100 mV and will accurately detect "1" signals based on a zero level voltage threshold of 100 mV.

As shown in FIG. 4, a higher zero level voltage threshold is needed between Time 0 and Time 3 to accommodate the shift in the USB 2.0 bus zero level above 100 mV. Thus, in an example embodiment of the present invention, a control signal of the embedded USB transceiver interface of the host controller triggers the host transceiver to select a higher zero level voltage threshold (e.g., approximately 200 mV) during high-speed chirp and a default zero level voltage threshold (e.g., approximately 100 mV) after high-speed chirp.

The control signal triggers the host transceiver to select the higher zero level voltage threshold at Time 0, when the host drives the reset signal on the USB 2.0 bus, and triggers the host transceiver to select the default zero level voltage threshold at Time 2, when the host detects the device chirp K. In another example embodiment, the control signal triggers the host transceiver to select the default zero level voltage threshold at Time 4, after the host drives the sequence of chirp pulses on the USB 2.0 bus. As will be apparent to persons skilled in the relevant art(s), the control signal can trigger the host transceiver to select the default zero level voltage threshold at other times between Time 2 and Time 4.

The control signal may be the CHIRP_ENABLE signal added to the embedded USB transceiver interface, as shown in FIG. 3B. Alternatively, the control signal can be a UTMI or UTMI+ specified signal, such as the RESET signal, also shown in FIG. 3B.

Figure 5:
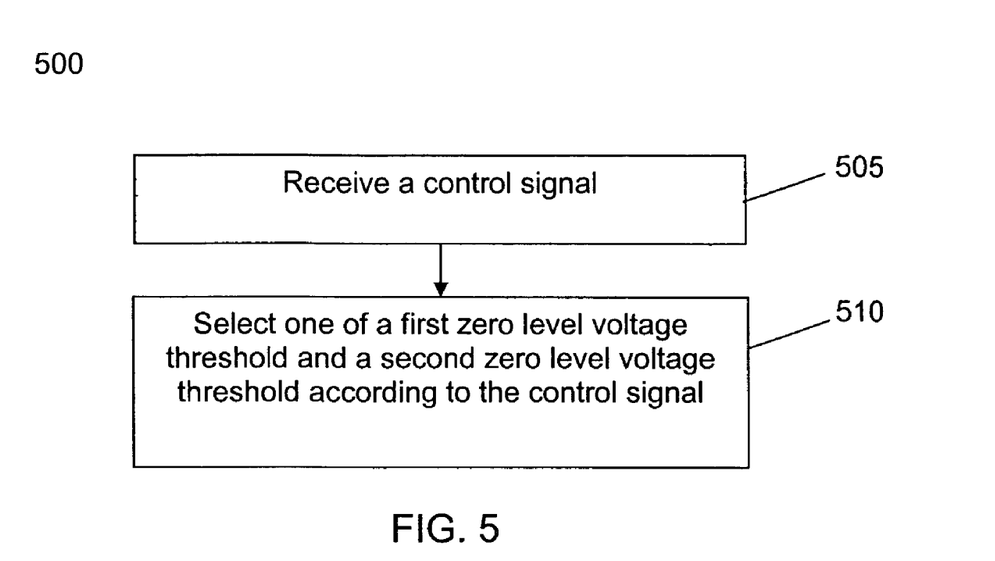
FIGS. 5-7 show flowcharts providing example steps for extending the functionality of an embedded USB transceiver interface to handle threshold shift of a USB 2.0 bus during high-speed chirp, in accordance with example embodiments of the present invention.
Figure 6:
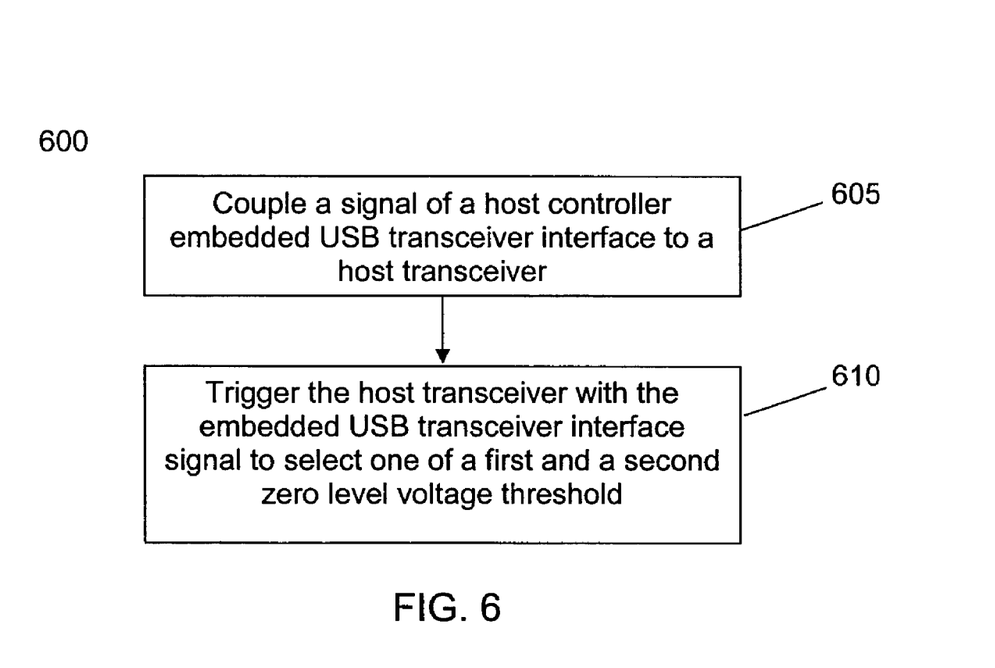
Figure 7:
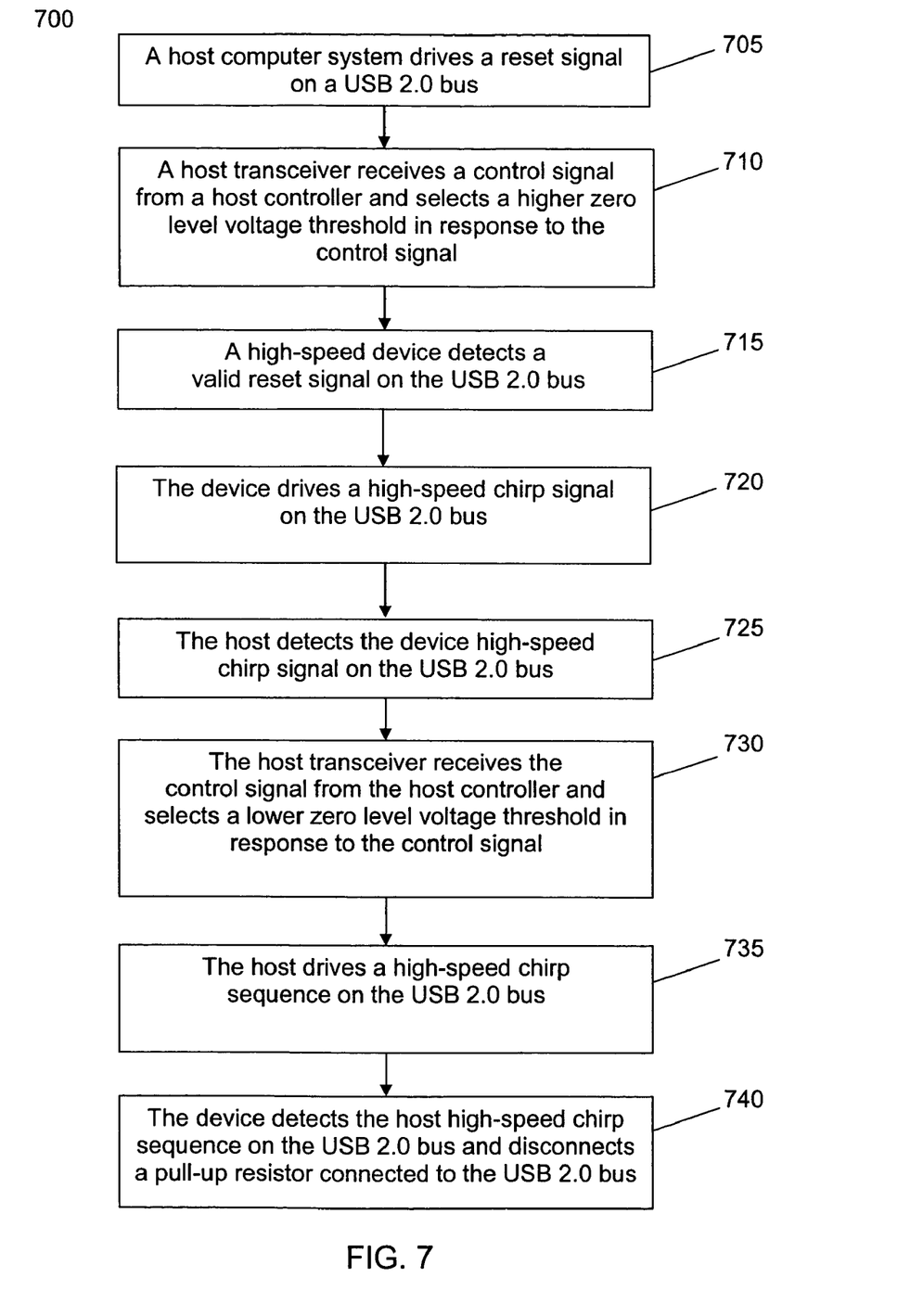

FIGS. 5-7 show flowcharts, providing example steps for extending the functionality of an embedded USB transceiver interface to handle threshold shift of a USB 2.0 bus during high-speed chirp, according to one or more embodiments of the present invention. The steps of FIGS. 5-7 do not necessarily have to occur in the order shown, as will be apparent to persons skilled in the relevant art(s) based on the teachings herein. These steps are described in detail below.

FIG. 5 shows a flowchart 500, providing example high-level steps for a transceiver of a host computer system coupled by a USB 2.0 bus to a device to handle threshold shift of the bus during high-speed chirp. In step 505, the transceiver receives a control signal, and in step 510, the transceiver selects one of a first and a second zero level voltage threshold according to the control signal. The first zero level voltage threshold is higher than the second zero level voltage threshold to handle the threshold shift of the bus during high-speed chirp. Example values for the first and second zero level voltage thresholds include 200 mV and 100 mV, respectively.

FIG. 6 shows a flowchart 600, providing example high-level steps for a host computer system coupled by a USB 2.0 bus to a device to handle threshold shift of the bus during high-speed chirp. In step 605, a signal of a host controller embedded USB transceiver interface is coupled to a host transceiver. In step 610, the host transceiver is triggered with the embedded USB transceiver interface signal to select one of a first and a second zero level voltage threshold. The first zero level voltage threshold is higher than the second zero level voltage threshold to handle the threshold shift of the bus during high-speed chirp. As indicated above, example values for the first and second zero level voltage thresholds include 200 mV and 100 mV, respectively.

FIG. 7 shows a flowchart 700, providing example steps for extending the functionality of an embedded USB transceiver interface to handle threshold shift of a USB 2.0 bus during high-speed chirp. In step 705, a host computer system drives a reset signal on a USB 2.0 bus, and in step 710, a host high-speed transceiver receives a control signal from a host controller and selects a higher zero level voltage threshold in response to the control signal. In an example embodiment, the control signal is a signal of the host controller embedded USB transceiver interface, such as a UTMI or UTMI+ defined signal (e.g., the reset signal) or a CHIRP_ENABLE signal added to the UTMI or UTMI+ signal set, as described above with respect to FIG. 3B. An example value for the higher zero level voltage threshold is approximately 200 mV.

In step 715, a high-speed device detects a valid reset signal on the bus, and in step 720, the device drives a high-speed chirp signal (e.g., a chirp K signal) on the bus to indicate that it is capable of communicating at the high-speed (i.e., 480 Mb/s) signaling bit rate.

In step 725, the host detects the device high-speed chirp signal on the bus, and in step 730, the host transceiver receives the control signal from the host controller and selects a lower zero level voltage threshold in response to the control signal. An example value for the lower zero level voltage threshold is approximately 100 mV.

In step 735, the host drives a high-speed chirp sequence on the bus, such as a sequence of chirp J and chirp K pulses, as shown between Time 2 and Time 4 in the example of FIG. 4. In an example embodiment, step 730 (i.e., the host transceiver receives the control signal from the host controller and selects the lower zero level voltage threshold in response to the control signal) occurs after step 735.

In step 740, the device detects the host high-speed chirp sequence on the bus and disconnects a pull-up resistor connected between a voltage supply and the bus. As described above, according to the USB 2.0 Specification, the device must first connect to the bus in the full-speed (i.e., 12 Mb/s) mode and engage in high-speed chirp with the host computer system before communicating at the high-speed (i.e., 480 Mb/s) signaling bit rate. Thus, prior to step 705, the device connects the pull-up resistor to the bus to indicate to the host that it is operating in the full-speed mode. After step 740, when high-speed chirp is completed, the device disconnects the pull-up resistor from the bus and communicates with the host at the high-speed signaling bit rate of 480 Mb/s.

By triggering the host transceiver with a control signal to adjust the zero level voltage threshold to a higher level during high-speed chirp, the methods of flowcharts 500, 600, and 700 provide more robust signaling, particularly for long USB 2.0 cables and maximum tolerance high-speed devices.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for a transceiver of a host coupled by a Universal Serial Bus (USB) 2.0 bus to a device to handle threshold shift of the bus during high-speed chirp, comprising:
   receiving by the transceiver of the host a control signal generated from a host controller; and
   selecting one of a first and a second zero level voltage threshold by the transceiver of the host controller according to the control signal, wherein the first zero level voltage threshold is higher than the second zero level voltage threshold to compensate for a shift in a zero level of the bus during high-speed chirp.

2. The method of claim 1, wherein the receiving step comprises:
   receiving a signal of the host controller embedded USB transceiver interface.

3. The method of claim 2, wherein the receiving step comprises:
   receiving a reset signal of the host controller embedded USB transceiver interface.

4. The method of claim 1, wherein the selecting step comprises:
   selecting the first zero level voltage threshold when the host drives a reset signal on the bus.

5. The method of claim 4, wherein the selecting step further comprises:
   selecting the second zero level voltage threshold when the host detects a device high-speed chirp signal on the bus.

6. The method of claim 5, wherein the device high-speed chirp signal includes a chirp K signal.

7. The method of claim 4, wherein the selecting step further comprises:
   selecting the second zero level voltage threshold after the host drives a sequence of high-speed chirp signals on the bus.

8. The method of claim 1, wherein the selecting step further comprises:
   selecting one of a first zero level voltage threshold that is greater than approximately 200 mV and a second zero level voltage threshold that is greater than approximately 100 mV.

9. A method for a host having a host controller and a host transceiver coupled by a Universal Serial Bus (USB) 2.0 bus to a device to handle threshold shift of the bus during high-speed chirp, comprising:
   coupling a signal generated by the host controller to the host transceiver; and
   triggering the host transceiver with the embedded USB transceiver interface signal to select one of a first and a second zero level voltage threshold;
   wherein the first zero level voltage threshold is greater than the second zero level voltage threshold to compensate for a shift in the zero level of the bus during high-speed chirp.

10. The method of claim 9, wherein the coupling step comprises:
    coupling a reset signal of the host controller embedded USB transceiver interface to the host transceiver.

11. The method of claim 9, wherein the triggering step comprises:
    triggering the host transceiver with the embedded USB transceiver interface signal to select the first zero level voltage threshold when the host drives a reset signal on the bus.

12. The method of claim 11, wherein the triggering step further comprises:
    triggering the host transceiver with the embedded USB transceiver interface signal to select the second zero level voltage threshold when the host detects a device high-speed chirp signal on the bus.

13. The method of claim 12, wherein the device high-speed chirp signal includes a chirp K signal.

14. The method of claim 11, wherein the triggering step further comprises:
    triggering the host transceiver with the embedded USB transceiver interface signal to select the second zero level voltage threshold after the host drives a sequence of high-speed chirp signals on the bus.

15. The method of claim 9, wherein the first zero level voltage threshold is greater than approximately 200 mV, and wherein the second zero level voltage threshold is greater than approximately 100 mV.

16. A system including a host coupled by a Universal Serial Bus (USB) 2.0 bus to a device to handle threshold shift of the bus during high-speed chirp, comprising:
    a host transceiver; and
    control means for triggering said the host transceiver to select one of a first and a second zero level voltage threshold;
    wherein the first zero level voltage threshold is higher than the second zero level voltage threshold to compensate for a shift in a zero level of the bus during high-speed chirp.

17. The system of claim 16, wherein said control means triggers said host transceiver to select the first zero level voltage threshold when the host drives a reset signal on the bus.

18. The system of claim 17, wherein said control means triggers said host transceiver to select the second zero level voltage threshold when the host detects a device high-speed chirp signal on the bus.

19. The system of claim 18, wherein the device high-speed chirp signal includes a chirp K signal.

20. The system of claim 17, wherein the control means triggers the host transceiver to select the second zero level voltage threshold after the host drives a sequence of high-speed chirp signals on the bus.

21. The system of claim 16, wherein the first zero level voltage threshold is greater than approximately 200 mV, and wherein the second zero level voltage threshold is greater than approximately 100 mV.

22. The system of claim 16, wherein the control means includes a signal of a host controller embedded USB transceiver interface.

23. The system of claim 22, wherein the embedded USB transceiver interface signal includes a reset signal.

* * * * *

UNITED STATES PATENT AND TRADEMARK OFFICE
CERTIFICATE OF CORRECTION

| | |
|---|---|
| PATENT NO. | : 7,281,069 B2 |
| APPLICATION NO. | : 10/929779 |
| DATED | : October 9, 2007 |
| INVENTOR(S) | : Turner et al. |

Page 1 of 1

It is certified that error appears in the above-identified patent and that said Letters Patent is hereby corrected as shown below:

At column 8, line 37, "said" should be deleted.

Signed and Sealed this

Twentieth Day of May, 2008

JON W. DUDAS
*Director of the United States Patent and Trademark Office*